Patented Dec. 4, 1951

2,577,208

UNITED STATES PATENT OFFICE 2,577,208

PRODUCTION OF KETONIC BODIES

Walter Reppe, Ludwigshafen on the Rhine, and August Magin, Mutterstadt/Pfalz, Germany No Drawing. Application February 9, 1950, Serial No. 143,362. In Germany October 1, 1948

11 Claims. (Cl. 260—406)

1

The present invention relates to the production of ketonic bodies, and, more particularly, to the production of aliphatic compounds containing at least one keto group and, eventually, in addition thereto carboxylic acid groups, hydroxy groups or functional groups derived therefrom. It is an object of the present invention to prepare these compounds from the cheapest and most readily available basic materials, i. e. carbon monoxide and low molecular olefinic hydrocarbons, such as ethylene and propylene.

It is known in the art that ethylene and carbon monoxide may be caused to react with one another forming intercondensation products according to a process commonly called "teleomerisation." This known process is generally carried out under the influence of certain catalysts which are capable of yielding free radicals. The process of the present invention differs fundamentally from this known process in that catalysts of quite different characteristics are used, and that products are obtained which cannot be compared at all with these "teleomerisation" products.

We have found, and this constitutes an object of our invention, that ketonic bodies are formed by causing carbon monoxide and water to act on olefines at elevated temperature and under increased pressure in the presence of certain catalysts.

While it is known that certain metals, in particular those capable of forming carbonyls, or their compounds may be used for the addition of carbon monoxide and water to the olefinic linkage under the formation of carboxylic acids, we have now found that the cyanides of these metals, when used in the interaction of the above mentioned three components direct the reaction another way. The most active catalysts of this type are the complex cyanides of nickel, e. g. the so-called "Belucci" salt $K_2[Ni^ICy_3]$, potassium tetracyanoniccolat $K_2[Ni^{II}Cy_4]$ or the corresponding complex salts of other alkali metals such as sodium or lithium, or of alkaline earth metals such as calcium, barium, and magnesium, or of other bivalent metals, such as zinc, cadmium or mercury, or of ammonia as well as the ammine compounds. Most suitable catalysts are such complex nickel cyanides as are capable of forming addition compounds with carbon monoxide or olefines wherein the linkage is reversible or the carbon monoxide or olefine is exchangeable with compounds containing cyano groups. Instead of the ready-made complex compounds we may also use compounds capable of forming such complex compounds, e. g. mixtures of metal cyanides and nickel-II-cyanide.

2

The catalysts defined above may be used in a state of dissolution or suspension. They may also be applied to the conventional carrier substances, such as aluminum oxide, silicic acid gel or pumice stone.

Without committing ourselves to a definite theory of the course of reaction involved in the process of our invention, we may assume that the olefine and the carbon monoxide are forming a more or less stable addition compound in the first stage which shall be illustrated in the most simple case as a formation of the hypothetic cyclopropanone 1 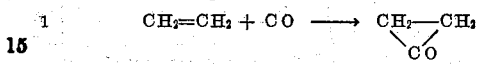

When further assuming that this addition compound will react with itself in the form of a bivalent radical, compounds should be formed which contain a plurality of the basic starting materials, viz. carbon monoxide and ethylene. This second stage may be illustrated by the following equation:

2 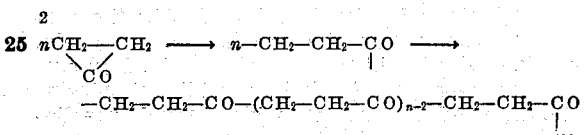

wherein "$n$" represents a whole number of at least 2. Depending on the reaction conditions, the chain being formed will be interrupted earlier or later by the water taking part in the reaction, or eventually the hydrogen formed according to a secondary reaction 3 $\quad CO + H_2O \rightarrow CO_2 + H_2$ will add at the ends of the chain, which may be illustrated by the following equations:

4 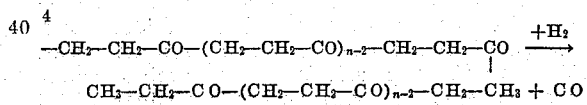

5 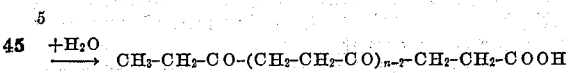

The adding of hydrogen thus should lead to the formation of ketones and keto alcohols, whereas the addition of water should lead to the formation of keto carboxylic acids. In the case of "$n$" representing "2" diethyl ketone or β-keto capronic acid (propionylpropionic acid) would be the most simple reaction products. As it is to be expected, derivatives of the primary reaction products, e. g. esters or cyclic ketones formed by condensation reactions in alkaline medium, may also be found as reaction products.

Generally speaking, we may use as starting materials any compounds containing an olefinic linkage, i. e. a double linkage between two aliphatic carbon atoms. Olefinic hydrocarbons of the aliphatic series, such as ethylene, propylene, butylene, butadiene, diisobutylene and their homologues, and cyclic olefines, such as cyclohexene, cyclooctene, terpenes or styrene, are the most suitable initial materials. Olefines containing substituents, e. g. allyl chloride, unsaturated alcohols, e. g. allyl alcohol, butene-3-ol-2, butene-2-diol-1.4, or olefine carboxylic acids may also be used.

We prefer to carry out the process according to the present invention at temperatures above 100° C., preferably between 100 and 250° C. When working at lower temperatures within this preferred range higher molecular products, in particular polyketones and polyketo carboxylic acids, are preferably formed, whereas at higher temperatures, probably owing to a favored formation of hydrogen according to Equation 3, relatively low molecular products are produced. We may also obtain higher molecular products at comparatively high temperatures, say in the neighborhood of 200° C., provided that the contact time is shorter which may be achieved by allowing the starting materials to react according to the trickling process.

The nature of the reaction products also depends on the pressure applied. Generally speaking, we prefer to work with a carbon monoxide pressure of at least 30 atmospheres, preferably of 50–200 atmospheres. The reaction may be carried out according to the batch method in high pressure vessels or continuously, e. g. to the counter- or direct-current process with rigidly arranged catalysts while circulating the carbon monoxide or the carbon monoxide-olefine mixture. When using such circulation, the carbon dioxide formed according to Equation 3 is preferably eliminated prior to reintroducing the carbon monoxide into the process. We may also work in the liquid phase with dissolved or suspended catalysts, if desired, while circulating olefines and carbon monoxide through the liquid.

Generally speaking, we prefer to use the water taking part in the reaction as a solvent, but we may also add other solvents, such as organic oxygen-containing solvents miscible with water, e. g. ethers or ketones or even saturated hydrocarbons, especially when using higher molecular olefines as initial materials. The use of these additional solvents may attribute to the formation of higher molecular reaction products instead of lower molecular ones. We may also dilute the gases taking part in the reaction. They may contain nitrogen, methane, or other gases. We may also use technical gases, such as water gas, or generator gas, or crude olefines. The ratio between carbon monoxide and olefine may vary to a large extent.

As already stated, reaction products of varying molecular weight may be formed depending on the reaction conditions. These, in turn, may be varied by changing the temperature, the pressure, the time of contact, the pH value, the type of catalyst, the CO : olefine ratio, and so on. It has been observed that neutral reaction products, i. e. products containing no free carboxylic acid groups, are favored by using an excess of olefine, whereas keto carboxylic acids are preferably formed when using the carbon monoxide in excess. When working within an alkaline pH range which may be achieved by the addition of soda, potash, lime, or amines, the formation of low molecular ketones or keto carboxylic acids is favored as compared with the working in neutral medium.

As to the nature of the reaction products formed according to our present invention it may be stated that the high molecular products are either polyketones or polyketo carboxylic acids or polyketo alcohols, insoluble or sparingly soluble in solvents, in addition to small amounts of high molecular esters. Lower molecular reaction products are soluble in organic solvents as a rule. The position of the keto groups is preferably in 1.4 with reference to each other. The process may even yield low molecular products, such as monoketones, monoketo carboxylic acids, and small amounts of esters. Part of the substances we have found in the products of our process have hitherto been unknown or differently accessible. They may be used for the production of plastics or intermediates for various application fields, e. g. plasticizers, lacquers, resins, textile assistants or tanning agents. By further chemical reactions, e. g. hydrogenation, oxydation, dehydration, amination, or vinylation, they may be converted into mono- and polycarboxylic acids, alcohols, amines, derivatives of the furane or pyrrole series, cyclic unsaturated or saturated ketones and so on.

The following examples will further illustrate how our invention may be carried out in practice without restricting it to these examples.

*Example 1*

A pressure-tight vessel of stainless steel (contents 5 litrs.) is charged with a solution of 240 grs. of potassium nickelcyanide ($K_2NiCy_4$) in 1200 ccms. of water. The air is expelled by nitrogen and 400 grs. of ethylene are pressed in at room temperature thereby obtaining a pressure of 50 atm. Carbon monoxide is then pressed in until the total pressure amounts to 100 atm. and the vessel is heated to 110° C. The pressure is thereby increased to 190 atm., but will then be decreasing continuously in the course of some hours to about 100 atm. Carbon monoxide is replenished from time to time until it is no longer used up. This requires usually about 30 hours. After cooling and releasing the pressure whereby 14 ltrs. of ethylene, 150 ltrs. of carbon monoxide and 27 ltrs. of carbon dioxide are reclaimed, the reaction product, consisting of a yellow pulverous solid substance and a pale reddish yellow solution is heated to drive off the volatile ingredients, viz. nickel carbonyl, hydrocyanic acid, and diethyl ketone.

The reaction product is then allowed to cool, the solid filtered off and washed with 2 ltrs. of water. Thus 560 grs. of a solid mixture of high molecular polyketones is obtained which has a decomposition point above 200° C. and which corresponds to the formula $(C_3H_4O)_x$; it is partly soluble in large amounts of water. From this aqueous solution a polyketone $C_{14}H_{22}O_4$ (M. P. 112° C.) may be isolated. It is probably formed by the interaction of $5C_2H_4 + 4CO + H_2$.

By extracting the filtrate, recovered from the above described solid reaction product, with ether small amounts of a mixture of polyketones, polyketo carboxylic acids and small amounts of esters may be isolated. The aqueous solution left over from the extraction with ether is acidified with sulphuric acid, freed from deposited nickel cyanide by filtration, and the acidified filtrate repeatedly extracted with ether. From the ether there may be recovered propionyl propionic acid (M. P. 39° C.), small amounts of propionic acid and higher polyketo carboxylic acids. From these there may be isolated two isomeric keto carboxylic acids $C_9H_{12}O_3$ (M. P. 127° C. 82° C., resp.) formed from $3C_2H_4+3CO$, and a keto carboxylic acid of the probable formula $C_{12}H_{18}O_5$ (M. P. 103° C.) formed from $4C_2H_4+4CO+H_2O$.

The nickel cyanide recovered as described above may again be used for preparing the catalysts by reaction with a corresponding amount of potassium cyanide.

When working under otherwise identical conditions at 200° C. under a pressure of 120 atms. a reaction product is obtained consisting of 50% of diethyl ketone and of a mixture of polyketones and higher molecular alcohols.

Example 2

The reaction is carried out in a vertical pressure-tight tube from stainless steel of 1 meter length and 30 mms. internal diameter which is charged with stainless steel turnings. At the upper end of the tube 40 grs. of a 4% aqueous solution of potassium nickel cyanide ($K_2NiCy_4$) are pressed in at 200° C. continuously, while at the same time 50 ltrs. (of normal conditions) of an equimolecular ethylene carbon monoxide mixture are led through the tube under 200 atmospheres' pressure in the same direction. At the bottom end of the tube the reaction product is continuously withdrawn and released from pressure. It consists of solid substances suspended in a liquid. Its composition is almost identical with the product obtained according to Example 1, and it may be worked up in the same manner.

Example 3

A stirring autoclave from stainless steel (4.8 ltrs.) is charged with a solution of 160 grs. of potassium nickel cyanide and 106 grs. of sodium carbonate in 1200 grs. of water, the air expelled by nitrogen, and then charged with a mixture of 400 grs. of ethylene and 130 grs. of carbon monoxide. This mixture is heated to 150° C. in the course of 2 hours, while stirring, and the pressure maintained at 170 atms. by continuously replenishing a mixture of equimolecular amounts of ethylene and carbon monoxide. After 22 hours the pressure does no longer decrease. At this point a total of 370 atms. has been used up by the reaction mixture. The pressure is released and the mixture allowed to cool. It forms two layers from which first the diethyl ketone is distilled off together with water. This distillate is saturated with sodium sulphate, the upper layer formed, consisting of diethyl ketone, separated off, dried with anhydrous sodium sulphate and distilled again. There are obtained 239 grs. of almost pure diethyl ketone (B. P. 102 to 103° C.). The weakly acid distillation residue is neutralized with sodium carbonate and then extracted with ether. The extract is fractionated after the removal of the ether whereby the following fractions are obtained:

104 grs. of octanedione-3.6 (B. P. 60 to 65° C./0.3 mm.; M. P. 35.5° C. after recryst. from cyclohexane)
92 grs. of undecanetrione (B. P. 120 to 125° C./0.3 mm.; M. P. 81° C. from cyclohexane)
45 grs. of crude tetradecanetetrone (B. P. 140 to 185° C./0.4 mm.; M. P. 112° C. from cyclohexane)
65 grs. of a black resinous residue The aqueous reaction mixture contains after the extraction with ether a high molecular polyketone which is insoluble in ether. It is filtered off, washed with water, and dried at the open air. Thus 45 grs. of a yellowish-brown sparingly soluble polyketone are obtained.

The filtrate is concentrated, and the catalyst deposited by the adding of methanol. After filtering, the solution is acidified with a 50 per cent sulphuric acid and again extracted with ether. After the removal of ether the extract is fractionated and the following fractions are obtained:

88 grs. of propionic acid in addition to water (B. P. up to 142° C.)
77 grs. of propionyl propionic acid (B. P. 110 to 125° C./0.4 mm., M. P. 39.5° C. after recryst. from toluene)
4 grs. of a $C_9$ acid (B. P. 150 to 190° C./0.5 mm., M. P. 81 to 82° C. from toulene)

Example 4

In a pressure-tight vessel as described in Example 3, which has been charged with 40 grs. of potassium nickel cyanide and 138 grs. of potassium carbonate in 1200 grs. of water, the air is expelled by nitrogen, 400 grams of ethylene and 130 grs. of carbon monoxide are pressed in and the vessel is heated to 150° C. By replenishing an equimolecular mixture of ethylene and carbon monoxide the pressure is maintained at from 130 to 150 atms. At the course of 14 hours the reaction mixture will thus take up about 440 atms. of the gas mixture.

In working up the reaction product in the manner described in Example 3, the following products are obtained:

(a) Ketones:
101 grs. of pure diethyl ketone
101 grs. of pure octanedione-3.6
101 grs. of crude undecanetrione
80 grs. of crude tetradecanetetrone
188 grs. of residue
107 grs. of solid polyketone (M. P. 170 to 180° C., mostly soluble in alcohol and acetone)

(b) Acids:
57 grs. of propionic acid
72 grs. of propionyl propionic acid
34 grs. of $C_9$ acid
55 grs. of solid acids, insoluble in ether
164 grs. of residue, soluble in soda solution

Example 5

In the manner described in Example 3 an equimolecular mixture of ethylene and carbon monoxide is pressed to a solution of 40 grs. of potassium nickel cyanide and 138 grs. of potassium carbonate in 1200 grs. of water. The reaction is carried out at 150° C. while maintaining a pressure of 150 atms. by replenishing the gas mixture. This takes about 9 hours until the pressure remains constant after 340 atms. being used up. In working up the reaction mixture in the manner described in Example 3, the following products are obtained:

(a) Ketones:
70 grs. of diethyl ketone
53 grs. of octanedione-3.6
58 grs. of undecanetrione
29 grs. of tetradecanetetrone
52 grs. of residue
31 grs. of solid polyketones (M. P. 142 to 145° C., mostly soluble in alcohol and tetrahydrofurane)

(b) Acids:
173 grs. of propionic acid
156 grs. of propionyl propionic acid
101 grs. of crude $C_9$ acid
142 grs. of residue
32 grs. of acids (M. P. 115 to 120° C., almost insoluble in ether)

*Example 6*

In a shaking pressure-tight vessel from stainless steel (250 ccms.) whch has been charged with a solution of 3 grs. of potassium nickel cyanide and 10.6 grs. of sodium carbonate in 20 grs. of water and 40 grs. of acetone, the air is expelled by nitrogen, the nitrogen replaced by ethylene, 15 grs. of ethylene pressed in and the pressure increased to 100 atms. by pressing in an equimolecular mixture of ethylene and carbon monoxide. The vessel is heated to 150° C. while shaking, and the pressure maintained at 140 atms. by continuous replenishing of the gas mixture. About 550 atms. of the mixture are used up in the course of 48 hours. After cooling and the release of pressure, 50 grs. of water are added and acetone and diethyl ketone are distilled off with water. The distillate is saturated with sodium sulphate, the upper layer, consisting of acetone and diethyl ketone, separated off, dried with sodium sulphate and the acetone is separated from the diethyl ketone (10 grs. boiling between 100 and 103° C.) by fractionating. The residue is extracted with ether, the ether distilled off, and the residue of the extract fractionated, thereby obtaining the following products:

9.5 grs. of octanedione (B. P. 70 to 85° C./0.4 mm.)
9.5 grs. of undecanetrione (B. P. 120 to 130° C./0.4 mm.)
1 gram of an unidentified oil (B. P. 155 to 190° C./0.4 to 0.8 mm.)
10 grs. of a resinous residue The solution remaining after the extraction with ether is filtered off and the solid residue washed with water and dried. It consists of 0.4 gr. of polyketones insoluble in ether. The filtrate is acidified with a 50 per cent sulphuric acid and also extracted with ether. After the ether has been distilled off, the following products are obtained:

3 grs .of an 82 per cent propionic acid (B. P. 40 to 70° C./30 mms.)
2.5 grs. of propionyl propionic acid (B. P. 120 to 155° C./0.4 mm.)
1 gram of an acid containing some $C_9$ acid
1 gram of residue

*Example 7*

3 grams of potassium nickel cyanide and 10.6 grams of sodium carbonate dissolved in 20 grams of water and 40 grams of tetrahydrofurane are treated for 34 hours with a mixture of ethylene and carbon monoxide in the manner described in Example 6. The reaction product is worked up in the manner described in Example 6 and the following products are obtained:

11 grs. of diethyl ketone
5 grs. of octanedione
4.8 grs. of undecanetrione
3.8 grs. of tetradecanetetrone
0.9 gram of resinous residue
0.5 gram of polyketone, difficultly soluble in ether
2.7 grs. of propionic acid
3.2 grs. of propionyl propionic acid
1.5 grs. of crude $C_9$ acid
2.7 grs. of residue and 0.3 gram of acid, sparingly soluble in ether

*Example 8*

A vertical tube from stainless steel having a length of 420 cms. and an internal diameter of 45 mms. is charged with a solution of 160 grs. of potassium nickel cyanide and 1120 grs. of potassium carbonate in 4920 grs. of water. After the air has been replaced by nitrogen and the latter by ethylene, 6 to 7 cbms. of a mixture of equimolecular amounts of ethylene and carbon monoxide per hour are circulated through the tube at from 140 to 150° C. and under a pressure of 150 atms. The vapours eventually accompanying the circulating gas are condensed in a reflux condenser and led back into the reaction vessel. Depending on the amount of the gas mixture used up in the reaction, a corresponding amount of fresh gas is added by means of a compressor. Carbon dioxide and inert gases which may accumulate in the circulating gas are removed in the course of the process according to the conventional methods. After from 8 to 10 hours the potassium carbonate in the reaction mixture has been neutralized substantially by the carboxylic and keto carboxylic acids formed. After this stage 400 ccms. of fresh solution of the above identified composition per hour are introduced at the lower end of the tube while a corresponding amount of the reaction solution is withdrawn at the upper end. When working up 11,270 grs. of the reaction solution according to Example 3, the following products are obtained:

28 grs. of diethyl ketone
79 grs. of polyketone, partially distillable
672 grs. of propionic acid
623 grs. of propionyl propionic acid
347 grs. of $C_9$ acid
97 grs. of indistillable acids, soluble in ether

*Example 9*

In a stirring vessel as described in Example 1 which has been charged with a solution of 160 grs. of potassium nickel cyanide in 1200 grs. of water and has been freed from air, 400 grs. of ethylene are pressed in and the pressure is increased by pressing in carbon monoxide until it has reached 100 atms. The vessel is then heated to from 185 to 200° C. and the pressure maintained at from 140 to 180 atms. by continuously pressing in carbon monoxide. The pressure remains constant after 10 hours and after a total of 230 atms. being taken up. After cooling and releasing of the pressure, the reaction product forms two layers. When distilling the upper oily layer the following fractions, consisting of ketones and keto alcohols, are obtained:

36 grs. boiling at 40 to 50° C./80 to 90 mms.
32.5 grs. boiling at 70 to 120° C./0.5 mm.
14 grs. boiling at 120 to 160° C./0.5 mm.
40 grs. boiling at 160 to 185° C./0.5 to 1 mm.

These fractions have an OH-number from 55 to 117.

The lower aqueous layer yields 12 grs. of diethyl ketone by distillation and about 10 grs. of higher boiling ketones (B. P. up to 180° C./0.5 mm). by extraction with ether.

The aqueous liquid remaining over from the ether extraction is acidified with 50% sulphuric acid and again extracted with ether, and the extract fractionated by distillation, yielding the following fractions:

35 grs. of propionic acid
6.5 grs. of acid (B. P. 50 to 120° C./0.5 mm.)
21 grs. of acids (B. P. 120 to 180° C./0.5 mm.; acid number 185, ester number 115)
4.8 grs. of acids (B. P. 180 to 210° C./0.5 mm.)

These three latter fractions are mixtures of keto carboxlic acids and esters.

What we claim is:

1. A process for the production of ketonic compounds which comprises reacting an olefinic compound with carbon monoxide and water in the presence of a cyanide of a metal capable of forming metal carbonyls at from 100° C. to 250° C. and at a pressure of at least 10 atmospheres.

2. A process for the production of ketonic compounds which comprises reacting an olefine with carbon monoxide and water in the presence of a complex nickel-cyanide catalyst at from 100° C. to 250° C. and at a pressure of at least 10 atmospheres.

3. A process for the production of ketonic compounds which comprises reacting a low molecular aliphatic olefine hydrocarbon with carbon monoxide and water in the presence of a complex nickel-cyanide catalyst at from 100° C. to 250° C. and at a pressure of at least 10 atmospheres.

4. A process for the production of ketonic compounds which comprises reacting ethylene with carbon monoxide and water in the presence of a complex nickel-cyanide catalyst at from 100° C. to 250° C. and at a pressure of at least 10 atmospheres.

5. A process for the productin of ketonic compounds which comprises reacting an olefinic compound with carbon monoxide and water in the presence of a complex alkali metal nickel-cyanide catalyst at from 100° C. to 250° C. and at a pressure of at least 10 atmospheres.

6. A process for the production of ketonic compounds which comprises reacting an olefinic compound with carbon monoxide and water in the presence of a complex potassium nickel-cyanide at from 100° C. to 250° C. and at a pressure of at least 10 atmospheres.

7. A process for the production of ketonic compounds which comprises reacting approximately 400 grams ethylene with carbon monoxide and about 1200 grams of water in the presence of about 240 grams of potassium nickel-cyanide at a temperature between 100° C. and 250° C. and a pressure above about 100 atmospheres.

8. A process for the production of ketonic compounds which comprises continuously contacting a 4% aqueous solution of potassium nickel-cyanide with an approximately equimolar mixture of ethylene and carbon monoxide at about 200° C. and 200 atmospheres pressure, said solution and said mixture being present in the approximate proportions of 1 gram solution to 1.25 liters of mixture.

9. A process for the production of ketonic compounds which comprises reacting approximately 400 grams of ethylene and 160 grams of carbon monoxide with about 1200 grams of water in the presence of about 160 grams of potassium nickel-cyanide and about 106 grams of sodium carbonate at a temperature of about 150° C. and at a pressure of about 170 atmospheres, and maintaining said pressure by continuously adding a mixture of equimolar amounts of ethylene and carbon monoxide.

10. A process for the production of ketonic compounds which comprises reacting approximately 400 grams of ethylene and 130 grams of carbon monoxide with about 1200 grams of water in the presence of about 40 grams of potassium nickel-cyanide and about 138 grams of potassium carbonate at a temperature of about 150° C. and at a pressure between 130 and 150 atmospheres, and maintaining said pressure by continuously adding a mixture of equimolar amounts of ethylene and carbon monoxide.

11. A process for the production of ketonic bodies which comprises reacting approximately 15 grams of ethylene with about 20 grams of water and 40 grams of acetone in the presence of about 3 grams of potassium nickel-cyanide and about 10.6 grams of sodium carbonate at a temperature of about 150° C. and a pressure of about 140 atmospheres, said pressure being established and maintained by the continuous addition of a mixture of equimolar amounts of ethylene and carbon monoxide.

WALTER REPPE.
AUGUST MAGIN.

REFERENCES CITED

The following references are of record in the file of this patent:

UNITED STATES PATENTS

| Number | Name | Date |
|---|---|---|
| 2,433,016 | Coffman | Dec. 13, 1947 |
| 2,448,368 | Gresham et al. | Aug. 31, 1948 |
| 2,448,375 | Larson | Aug. 31, 1948 |
| 2,510,105 | Hedberg | June 6, 1950 |